United States Patent [19]

Thies et al.

[11] Patent Number: 5,378,756

[45] Date of Patent: Jan. 3, 1995

[54] POLYURETHANE THICKENER COMPOSITIONS AND THEIR USE FOR THICKENING AQUEOUS SYSTEMS

[75] Inventors: Uwe Thies, Goslar; Michael Griesbach, Vienenburg; Jürgen Schwindt, Leverkusen; Jan Mazanek, Köln, all of Germany

[73] Assignees: Bayer Aktiengesellschaft, Leverkusen; Gebr. Borchers AG, Goslar, both of Germany

[21] Appl. No.: 216,733

[22] Filed: Mar. 22, 1994

[30] Foreign Application Priority Data

Apr. 1, 1993 [DE] Germany .............................. 4310702

[51] Int. Cl.$^6$ ............................................. C08L 75/00
[52] U.S. Cl. ....................................... 524/591; 524/507
[58] Field of Search ................................. 524/591, 507

[56] References Cited

U.S. PATENT DOCUMENTS

| | | | |
|---|---|---|---|
| 4,079,028 | 3/1978 | Emmons et al. | 260/29.6 NR |
| 4,155,892 | 5/1979 | Emmons et al. | 260/29.2 TN |
| 4,499,233 | 2/1985 | Tetenbaum et al. | 524/591 |
| 5,023,309 | 6/1991 | Kruse et al. | 528/49 |

*Primary Examiner*—Edward Cain
*Attorney, Agent, or Firm*—Joseph C. Gil; Thomas W. Roy

[57] ABSTRACT

The present invention is directed to a thickener composition for thickening aqueous systems which contains a mixture of
 a) a water-soluble or water-dispersible thickener containing urethane groups,
 b) a non-ionic emulsifier and
 c) a compound corresponding to the formula

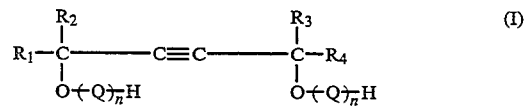

wherein
 $R_1$ and $R_3$ may be the same or different and represent hydrocarbon radicals and
 $R_2$ and $R_4$ may be the same of different and represent hydrogen or hydrocarbon radicals,
 Q represents alkylene oxide units obtained by the alkoxylation of alcohols with alkylene oxides having 2 to 4 carbon atoms, and
 n represents a number from 0 to 120.

The invention also relates to the use of this thickener composition as a thickener for aqueous systems.

16 Claims, No Drawings

POLYURETHANE THICKENER COMPOSITIONS AND THEIR USE FOR THICKENING AQUEOUS SYSTEMS

BACKGROUND OF THE INVENTION

1. Field of the Invention

This invention relates to thickener compositions, which are distinguished by exceptionally low viscosity (i.e. the viscosity of the concentrated aqueous solutions of the compositions) combined with a high thickening action, and to their use for thickening aqueous systems.

2. Description of the Prior Art

Polyurethane thickeners for aqueous systems are described in numerous publications (see e.g. DE-OS 1,444,243, DE-OS 3,630,319, EP-A-0,031,777, EP-A-0,307,775, EP-A-0,495,373, U.S. Pat. No. 4,079,028, U.S. Pat. No. 4,155,892, U.S. Pat. No. 4,499,233 and U.S. Pat. No. 5,023,309).

Common to all of these known thickeners is the simultaneous presence of (i) hydrophilic segments in a quantity of at least 50% by weight, (ii) hydrophobic segments in a quantity of at most 10% by weight and (iii) urethane groups. The "hydrophilic segments" in these thickeners are primarily polyether chains having at least 5 alkylene oxide units as chain segments in which at least 60 mol-% of these units are ethylene oxide units. The "hydrophobic segments" are primarily hydrocarbon segments having at least 6 carbon atoms.

These polyurethane thickeners are suitable as auxiliary agents for adjusting the flow properties of aqueous systems such as automotive and industrial lacquers, paints and substances for coloring plaster, printing and textile colors, pigment printing pastes, pharmaceutical preparations and cosmetic preparations, formulations for plant protective agents, filler dispersions, etc.

Although the known polyurethane thickeners have a wide range of application, they have one major disadvantage: They are very difficult to incorporate into aqueous systems because their viscosity when in the form of an aqueous solution is too high.

Many experiments have been carried out in the past to reduce the viscosity of the thickeners. It was attempted to lower the viscosity during preparation of the thickeners, e.g., by lowering their molecular weight, but this always resulted in a reduction in the thickening effect within a homologous series.

The viscosity of aqueous solutions of polyurethane thickeners could also be reduced by adding emulsifiers such as alkoxylated alcohols or phenols. However, this method has the disadvantage that these emulsifiers must be used at high concentrations in order to produce a sufficient lowering of the, viscosity of the thickener. Even then, the viscosity of the thickeners cannot always be lowered to the required level, especially in the case of highly active thickeners.

Another commonly used method for lowering the internal viscosity of aqueous polyurethane thickener solutions is the addition of water-miscible solvents such as water-miscible monohydric or polyhydric alcohols. The main disadvantage of this otherwise highly effective method is the environmental concerns regarding the use these solvents, especially since the quantity of solvents required for obtaining the desired viscosity is often relatively high. Relatively large proportions of solvents may also impair the stability of the aqueous preparations or their properties in use, e.g., the ease with which they can be brush coated.

The obvious disadvantage of reducing the viscosity of the aqueous solutions by dilution with water is, of course, accompanied by an undesirable reduction in the concentration of the active substance (thickener) and hence a reduction in the thickening effect for a given total quantity of solution.

It is an object of the present invention to provide new polyurethane thickener compositions for aqueous systems which in the form of their aqueous solutions or dispersions have a substantially lower viscosity than analogous known systems, but which provide an at least equally good thickening effect.

It was surprisingly found that this problem could be solved by adding to the polyurethane thickener certain triple unsaturated alcohols of the type described below as component c) in addition to known emulsifiers. It was observed that the simultaneous addition of the components b) and c) described below has a synergistic action in lowering the viscosity. For a given concentration of emulsifiers b) the viscosity of the aqueous solutions or dispersions is substantially reduced in the presence of auxiliaries c) or conversely, much lower concentrations of emulsifiers b) are required for obtaining comparable viscosities in the presence of auxiliaries c).

SUMMARY OF THE INVENTION

The present invention is directed to a thickener composition for thickening aqueous systems which contains a mixture of
- a) a water-soluble or water-dispersible thickener containing urethane groups,
- b) a non-ionic emulsifier and
- c) a compound corresponding to the formula

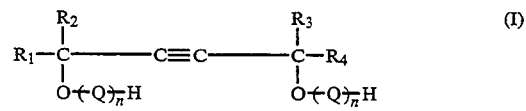

wherein
- $R_1$ and $R_3$ may be the same or different and represent hydrocarbon radicals and
- $R_2$ and $R_4$ may be the same of different and represent hydrogen or hydrocarbon radicals,
- Q represents alkylene oxide units obtained by the alkoxylation of alcohols with alkylene oxides having 2 to 4 carbon atoms, and
- n represents a number from 0 to 120.

The invention also relates to the use of this thickener composition as a thickener for aqueous systems.

DETAILED DESCRIPTION OF THE PRIOR ART

Component a) of the preparations according to the invention is selected from known polyurethane thickeners containing urethane groups and having at least 50% by weight of hydrophilic segments and at most 10% by weight of hydrophobic segments, wherein the hydrophilic and hydrophobic segments are defined as previously set forth.

Component b) is preferably selected from at least one compound corresponding to the formula $$R—[X—(Q')_x—H]_y \qquad (II)$$

wherein

R represents a hydrocarbon radical optionally containing inert substituents, in particular aliphatic, aromatic, araliphatic or alkaromatic hydrocarbon radicals having 6 to 50 carbon atoms, preferably an aromatic or alkaromatic hydrocarbon radical with 6 to 40 carbon atoms optionally having several aromatic rings and/or inert substituents, X represents oxygen or a radical of the formula

Q' represents an alkylene oxide chain obtained from the alkoxylation of alcohols or other starter molecules with $C_2$-$C_4$-alkylene oxides, preferably ethylene oxide and/or propylene oxide, provided that at least 70 mol-% of these oxides are ethylene oxide, x represents a number from 1 to 300, preferably 2 to 200, and more preferably 5 to 100 and Y represents a number from 1 to 20, preferably 1 to 10 and more preferably 1 to 4.

The alkylene oxide chains present in the emulsifiers of component b) are the known alkoxylation products of suitable starter molecules. Suitable alkylene oxides include ethylene oxide, propylene oxide and the isomeric butylene oxides. Preferred alkylene oxides are ethylene oxide or mixtures of ethylene oxide with propylene oxide containing at least 70 mol-% of ethylene oxide. The alkylene oxides may be added in admixture resulting in a random distribution and/or successively to obtain polyether blocks.

Suitable starter molecules include mono- or polyfunctional alcohols, phenols or amines conforming to the preceding definitions of R, X and y. Examples include n-hexanol, n-dodecanol, stearyl alcohol, phenol, commercial iso-nonylphenol or compounds corresponding to the formulas:

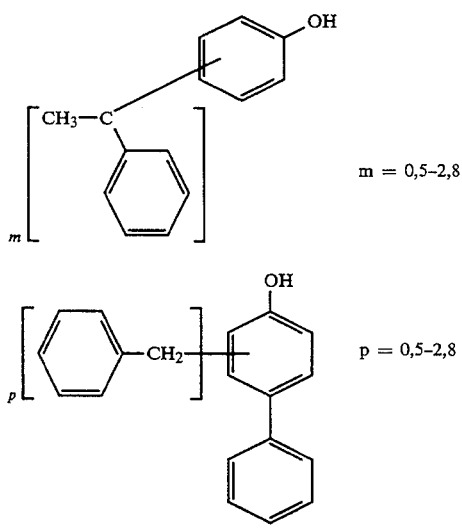

in which m and p are average values. Amines such as n-hexylamine, hexamethylenediamine, n-dodecylamine and stearylamine may also be used as starter molecules, but are less preferred.

Component c), which is essential to the invention, is selected from compounds corresponding to formula (I).

Preferred compounds corresponding to formula (I) are those in which $R_1$, $R_2$, $R_3$ and $R_4$ may be the same or different and represent alkyl groups having 1 to 6 carbon atoms, Q represents ethylene oxide and optionally propylene oxide units, provided that at least 70 mol-%, preferably 100 mol-% of the alkylene oxides are ethylene oxide and n represents 0 to 20.

The preparation of these compounds is carried out in known manner by the reaction of acetylene with aldehydes or ketones corresponding to the formulas

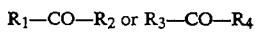

optionally followed by alkoxylation of the resulting diols. 2,4,7,9-tetramethyl-5-decine-4,7-diol optionally alkoxylated with 1 to 20 moles of ethylene and/or propylene oxide are particularly suitable for use as component c).

Other auxiliary agents d), which may also be used in the thickening agent compositions include polyhydric alcohols such as ethylene glycol which may be used, inter alia, for formulating the individual components.

In the thickener compositions according to the invention, component b) is present in a quantity of from 0.5 to 80% by weight, preferably 5 to 60% by weight and more preferably 10 to 50% by weight, based on the total weight of the mixture. Component c) is present in a quantity of 0.5 to 40% by weight, preferably 1 to 30% by weight and more preferably 1 to 15% by weight, based on the total weight of the mixture. The total quantity of components b) and c) is at most 90% by weight, preferably not more than 70% by weight, of the total weight of the mixture. The total weight of the mixture is the total weight of the anhydrous individual components a), b) and c).

In addition to these individual components, which are essential for the invention, other auxiliaries d) may be present, as previously mentioned. These auxiliaries may be present in an amount of at most 30% by weight, based on the total weight of the mixture.

The compositions according to the invention may be produced in known manner. For example, components b) and c) may be added successively with stirring and optionally heating to the polyurethane thickener a) which may be dissolved in water. Alternatively, a mixture may be prepared from components b) and c), and then added to the polyurethane thickener a) which may be dissolved in water. However, in this embodiment care must be taken to ensure that the mixtures of b) and c) are homogeneous because these components generally do not have unlimited miscibility. For this purpose, conventional solvents or diluents may be used as component d) to improve the miscibility of the individual components.

Another embodiment for producing the compositions according to the invention is to add components b) and c) and water to the polyurethane thickener a) immediately after its preparation. This method is particularly preferred because it has economical advantages over the methods mentioned above.

The compositions according to the invention are generally aqueous solutions or dispersions having a solids content of 10 to 80% by weight, preferably 30 to 60% by weight and more preferably 40 to 50% by weight, the "solids content" also including any components d) which may be present.

The viscosity of the preparations according to the invention may be determined by known methods, e.g., in a Haake rotary viscosimeter RV 12. or a Brookfield viscosimeter. The viscosity may vary within wide limits but the preparations preferably have flow properties which enable them to be easily handled by casting, pumping, etc. Such a viscosity, determined at 10.3 $s^{-1}$ and 23° C. is from 100 to 60,000 mPa.s, preferably 100 to 20,000 mPa.s and more preferably 100 to 10,000 mPa.s.

The preparations according to the invention may also be used in concentrated form for the purposes of the invention due to their relatively low viscosity. Particularly noteworthy in this regard is the observation that the thickening effect in the compositions according to the invention is not reduced in spite of their substantially reduced viscosity.

Another advantage of the preparations according to the invention is their compatibility with the aqueous systems which are to be thickened, e.g. emulsion paints, which enables the thickener to be incorporated easily and at the same time generally substantially reduces the so-called ripening time of the thickened preparations obtained, i.e., the time required for reaching the maximum possible viscosity.

The preparations according to the invention are suitable for thickening aqueous or predominantly aqueous systems such as dyes, printing pastes and pigment pastes, filler and pigment dispersions, textile, leather and paper auxiliaries, preparations for transporting petroleum, detergent compositions, adhesives, polishing waxes, formulations for pharmaceutical and veterinary purposes, plant protective preparations, cosmetic articles, etc. The water itself may also be thickened with the polyurethane thickeners according to the invention and then mixed with further additives or added to the aqueous preparations.

The thickener preparations according to the invention are suitable not only for thickening purely aqueous systems but also for thickening systems which contain a proportion of organic solvents or other volatile additives such as polyhydric alcohols. The aqueous systems which are to be thickened may also contain the usual auxiliary agents and additives used in such systems, such as defoamers, fluidizing and levelling agents, fillers, pigments and the like.

Examples of aqueous systems which may be thickened according to the invention include aqueous polyacrylate dispersions, aqueous dispersions of copolymers of olefinically unsaturated monomers, aqueous polyvinyl acetate dispersions, aqueous polyurethane dispersions, aqueous polyester dispersions and in particular the following compositions which are based on such dispersions: aqueous motor vehicle and industrial lacquers, colors for plasters and paints, printing and textile inks, pigment printing pastes, aqueous pharmaceutical and cosmetic formulations, plant protection formulations, filler and pigment dispersions, detergent compositions, adhesives, waxes and polishes and for the transport of petroleum.

When the preparations according to the invention are used for thickening emulsion paints, they frequently improve the levelling of these systems as well as improving the surface of the films produced from such paints. Another advantage of the preparations according to the invention is that when they are used in emulsion paints containing pigments or fillers, they frequently improve the wetting of these solid substances so that the process of dispersion, i.e., the preparation of the emulsion paints, is facilitated. Lacquer films produced with the aid of the emulsion paints thickened according to the invention are also in many cases distinguished by their improved gloss.

The following examples serve to illustrate the invention in more detail. All parts and percentages are by weight unless otherwise indicated.

EXAMPLES

Examples 1 to 5

Preparation of a polyurethane thickener a)

1250 ml of benzene and 23 ml of 1N $H_2SO_4$ were added to 5680 parts by weight of a linear polyethylene glycol ether (molecular weight 6000) in a stirrer apparatus and the reaction mixture was heated to 105° C. for 3 hours. 45 ml of water separated during this time while the benzene was kept in circulation. The benzene was then distilled off during 1 hour and 45 minutes. Finally, under a vacuum of 14 mm Hg. 0.336 pads by weight of iron acetyl acetonate were added to the polyethylene glycol ether at 75° C. and dissolved at this temperature in the course of 1 hour. 98 parts by weight of tolylene-2,4- and tolylene-2,6-diisocyanate (mixing ratio 65:35) and 235 parts by weight of stearyl isocyanate were added to this pretreated polyethylene glycol ether at 75° C. A slightly exothermic reaction was observed after the introduction of the isocyanates. The reaction was completed by stirring for one hour at 100° C. under nitrogen as protective gas. The reaction product, polyurethane thickener a), was a solid, easily friable wax after cooling.

To 25 g of polyurethane thickener a) were added varying quantities of a non-ionic surfactant corresponding to the formula

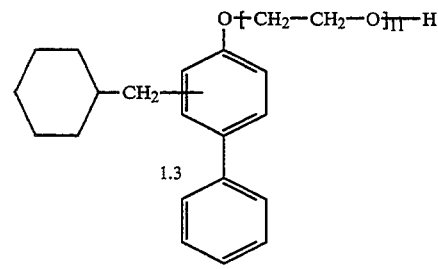

as component b) to 25 g of polyurethane thickener a), varying quantities of 2,4,7,9-tetramethyl-5-decine-4,7-diol as component c1), and sufficient water to provide a mixture having a total weight of 100 g.

The mixtures were stirred at 60° C. for 30 minutes (500 rpm) and then stored at 50° C. for 8 hours and subsequently at room temperature for 8 hours. The viscosity of the resulting solutions was determined in a Haake Viscosimeter RV 12, measuring body SV DIN, at 23° C. and 10.3 $s^{-1}$. The results are set forth in Table 1.

TABLE 1

| | Composition of the thickener preparation | | | |
|---|---|---|---|---|
| Example No. | Thickener a) | Component b) | Component c) | Viscosity (mPa.s/23° C.) |
| 1 | 25 | 25 | 0.5 | 24500 |
| 2 | 25 | 25 | 1.0 | 16300 |
| 3 | 25 | 25 | 2.0 | 12700 |
| 4 | 25 | 25 | 3.5 | 6300 |

TABLE 1-continued

| Example No. | Composition of the thickener preparation | | | Viscosity (mPa.s/23° C.) |
|---|---|---|---|---|
| | Thickener a) | Component b) | Component c) | |
| 5 | 25 | 21.5 | 3.5 | 6500 |

Comparison Examples 1 to 3

The procedure was the same as in Examples 1 to 5 except that components b) and c) either were not added or were added singly. The results are set forth in Table 2.

TABLE 2

| Comparison Example No. | Composition of the thickener preparation | | | Viscosity (mPa.s/ 23° C. |
|---|---|---|---|---|
| | Thickener a) | Component b) | Component c) | |
| 1 | 25 | — | — | too high[2] (not measurable |
| 2 | 25 | 25 | — | 29500 |
| 3 | 25 | — | 1%[1] | too high[2] |
| 3a | 25 | — | 5%[1] | not measurable |

[1]not completely soluble
[2]>60000 mPa.s

Examples 6 to 9

The procedure was carried out as described in Examples 1 to 5 with the exception that a compound according to U.S. Pat. No. 4,079,028 (herein incorporated by reference), Example 79, was used as thickener a). The composition and the viscosities of the solutions obtained are set forth in Table 3.

TABLE 3

| Example No. | Composition of the thickener preparation | | | Viscosity (mPa.s/23° C.) |
|---|---|---|---|---|
| | Thickener a) | Component b) | Component c) | |
| 6 | 25 | 15 | 1 | 15000 |
| 7 | 25 | 15 | 2 | 7900 |
| 8 | 25 | 15 | 3 | 5400 |
| 9 | 25 | 15 | 5 | 4100 |

Comparison Examples 4 and 5

The procedure was carried out as described in Examples 6 to 8 with the exception that the mixtures of components b) and c) according to the invention were not present. The results are set forth in Table 4.

TABLE 4

| Comparison Example No. | Composition of the thickener preparation | | | Viscosity (mPa.s/ 23° C. |
|---|---|---|---|---|
| | Thickener a) | Component b) | Component c) | |
| 4 | 25 | — | — | too high[1] (not measurable) |
| 5 | 25 | 15 | — | too high (not measurable) |

[1]>60000 mPa.s

Examples 10 to 13

The following examples demonstrate that the thickening action of polyurethane thickener a) was not deleteriously affected by the viscosity lowering additives b) and c).
Measurement of the thickener effect 2 g of an aqueous solution of a thickener preparation were added in five parallel experiments to 98 g of a commercial polyacrylate dispersion (Dilexo RA3 of Condea, 2000 Hamburg). The concentration of the solutions was in each case 2.5% by weight, based on the polyurethane thickener a). The mixtures thus prepared were stirred for 5 minutes at 2000 rpm. The homogeneous dispersions thus obtained were stored at 23° C. for 24 hours. The viscosity was then measured as described above. The results are set forth in Table 5.

TABLE 5

| Example No. | Thickener preparation from Example No. | Viscosity (mPa.s) (23° C.) |
|---|---|---|
| 9 | 6 | 13000 |
| 10 | 7 | 13100 |
| 11 | 8 | 13200 |
| 12 | 9 | 13100 |
| 13 | Comparison Example No. 5 | 13000 |

Examples 14 to 22

The procedure was carried out as described in Examples 1 to 5 with the exception that polyurethane thickener a) was a compound analogous to that of U.S. Pat. No. 4,079,028, Example 79 except that tolylene diisocyanate was replaced by hexamethylene diisocyanate. The results are set forth in Table 6. Table 6 also set forth the thickening effect of the preparations according to the invention. The thickening effect was measured as described in to Examples 10 to 13. The results demonstrate that the thickening action was not affected by the additives according to the invention.

TABLE 6

| Example No. | Composition of the thickener preparations | | | Viscosity mPa.s | Thickener effect mPa.s/23° C. |
|---|---|---|---|---|---|
| | Thickener a) | Component b) | Component c) | | |
| 14 | 25 | 15 | 1 | 47500 | 13100 |
| 15 | 25 | 15 | 2 | 23300 | 13000 |
| 16 | 25 | 15 | 3 | 16000 | 13200 |
| 17 | 25 | 15 | 5 | 12000 | 13200 |
| 18 | 25 | 20 | 3 | 13200 | 13300 |
| 19 | 25 | 25 | 5 | 9600 | 13100 |
| 20 | 22 | 22 | 3.5 | 6800 | 13300 |
| 21 | 22 | 18.5 | 3.5 | 7540 | 13000 |
| 22 | 18.5 | 22 | 3.5 | 3860 | 12800 |

Comparison Examples 6 to 8

The procedure was the same as described in Examples 14 to 22 with the exception that the mixtures of component b) and c) according to the invention were not present. The results are set forth in Table 7.

TABLE 7

| Comparison Example No. | Composition of the thickener preparation | | | Viscosity (mPa.s) 23° C. | Thickener effect mPa.s |
|---|---|---|---|---|---|
| | Thickener | Component b) | Component c) | | |
| 6 | 22 | 22 | — | 40500 | 13200 |
| 7 | 22 | 22 | ethylene glycol 3.5 | 20500 | 13300 |
| 8 | 22 | 22 | butyldiglycol 3.5 | 12800 | 13000 |

Examples 23 to 29

The procedure was the same as in Example 20 with the exception that other emulsifiers b) were used instead of emulsifiers b) from Example 1. The viscosities and the thickener effects are set forth in Table 8a.

TABLE 8a

| Example No. | Component b) | Viscosity (mPa.s/ 23° C.) | Thickener effect (mPa.s/23° C.) |
|---|---|---|---|
| 23 | Oleyl alcohol/20 EO | 23700 | 13400 |
| 24 | Stearyl alcohol/30 EO | 57900 | 13000 |
| 25 | Stearyl alcohol/10 EO | >60000 | 13700 |
| 26 | Nonyl phenol/30 EO | 10350 | 13150 |
| 27 | Nonyl phenol/10 EO | 7000 | 13550 |
| 28 | Emulsifier WN[1] | 7900 | 13200 |
| 29 | Borchigen DFN[2] | 7200 | 13300 |

[1]Non-ionic tenside of Bayer AG, Germany
[2]Non-ionic tenside of Borchers AG, Germany, 50% solution in water Comparison Examples 9 to 15

The procedure was the same as described in Examples 23 to 29 with the exception that component c) was not present.

TABLE 8b

| Comparison Example No. | Example No. | Viscosity (mPa.s) | Thickener effect (mPa.s) |
|---|---|---|---|
| 9 | 23 | >60000 | 13400 |
| 10 | 24 | >60000 | 13650 |
| 11 | 25 | >60000 | 13680 |
| 12 | 26 | >60000 | 13650 |
| 13 | 27 | 44200 | 13330 |
| 14 | 28 | 46300 | 13000 |
| 15 | 29 | 41050 | 13580 |

Examples 30 to 33

The procedure was the same as described in Example 20 with the exception that 2,4,7,9-tetramethyl-5-decine-4,7-diol alkoxylated with varying quantities of ethylene oxide were used as component c). The viscosities of the thickener compositions according to the invention are set forth in Table 9.

TABLE 9

| Example No. | % by Wt. Ethylene oxide in Component B | Viscosity mPa.s | Thickener effect mPa.s |
|---|---|---|---|
| 30 | 20 | 7900 | 13300 |
| 31 | 40 | 11200 | 13650 |
| 32 | 65 | 15080 | 13600 |
| 33 | 85 | 20500 | 13650 |

Examples 34 to 38

The procedure was the same as described in Example 20 with the exception that component c) was mixed with solvents. The solvents and the results are set forth in Table 10.

TABLE 10

| Example No. | % by wt. of Solvent in Component c) | Viscosity mPa.s/23° C. | Thickener effect mPa.s/23° C. |
|---|---|---|---|
| 34 | 50% ethylene glycol | 11750 | 13300 |
| 34a | 25% ethylene glycol | 9450 | 13500 |
| 35 | 50% propylene glycol | 12980 | 13600 |
| 35a | 25% Propylene glycol | 9800 | 13500 |
| 36 | 50% 2-ethylhexanol | 7540 | 13300 |
| 37 | 15% tetraethylene glycol | 8590 | 13600 |
| 38 | 15% polyethylene glycol MWt. 400 | 8950 | 13600 |

Example 39

0.5% by weight of a pigment paste (Colanylblau A2 R 100, available from Hoechst AG) was diluted 1:9 with water and added to a gloss dispersion based on an acrylate having the following composition:

| | | |
|---|---|---|
| AMP 90[1] | 2.5 g | 2.5 g |
| Borchigen ND[2], 25% in water | 13.6 g | 13.6 g |
| Neocryl AP 2860[3] | 3.2 g | 3.2 g |
| Thickener composition from Comparison Example 2 | 20.0 g | — |
| Thickener composition according to the invention from Example 5 | — | 27.7 g |
| TiO$_2$-RHD-2 | 225.0 g | 225.0 g |
| Methoxybutanol | 17.0 g | 17.0 g |
| Propylene glycol | 17.0 g | 17.0 g |
| Butyl diglycol | 17.0 g | 17.0 g |
| Water | 44.7 g | 42.0 g |
| Neocryl XK 62[4] | 540.0 g | 540.0 g |
| Water | 100.0 g | 100.0 g |

[1]2-Amino-2-methylpropanol-1, 90% in water), Angus Chemie GmbH, Essen
[2]Wetting agent, Gebr. Borchers AG, Goslar
[3]Defoamant, JCJ Resins, Runcorn, England
[4]anionic dispersion based on acrylate/styrene, JCJ Resins The paint was applied to cardboard by brush and after drying the color yield was assessed visually on a scale of 1 (best sample) to 5. Assessment of the paints produced with thickeners:
According to the invention: 1
Without component c): 3

Examples 40 to 42 and Comparison Examples 16 to 18

The procedure was the same as described in Example 39 but in these examples the levelling, airing and surface character of the coating produced were assessed on the same visual scale. The results are set forth in Table 11.

TABLE 11

| Example No. | Comparison Example No. | Thickener preparations from | Property | | |
|---|---|---|---|---|---|
| | | | Levelling | Airing | Surface character |
| 40 | | Example 5 | 1 | | |
| | 16 | Comparison Example 2 | 2 | | |
| 41 | | Example 5 | | 1 | |
| | 17 | Comparison Example 2 | | 2 | |
| 42 | | Example 5 | | | 1 |
| | 18 | Comparsion Example 2 | | | 2 |

Example 43 and Comparison Example 19

The following example demonstrates that the thickener compositions according to the invention provide a considerable savings in the ripening time of the paint and the gloss of the painted surfaces to be obtained. Gloss emulsions were prepared as described in Example 39 and their viscosity was determined in a Haake-Viscosimeter RV 12, measuring body SV at 23° C. The viscosities obtained are set forth in Table 12.

TABLE 12

| Example No. | Comparison Example No. | Thickener from | Viscosity at x rpm (Pa.s) X = 1 | 2 | 4 | 8 | 16 | 32 | 64 | after hours | Gardner gloss (60° C.) |
|---|---|---|---|---|---|---|---|---|---|---|---|
| 43 |  | Example 5 | 25 | 22 | 19 | 15 | 13 | 10 | 8 | 2 | 85.6 |
|  | 19 | Comparison Example 2 | 25 | 22 | 19 | 15 | 13 | 10 | 8 | 24 | 81.1 |

Examples 44 and 45 and Comparison Examples 20 to 25

The procedures were the same as described in Example 5 and in Comparison Examples 2 and 3 with the exception that commercial polyurethane thickeners were used. The thickeners and the results are set forth in Table 13.

TABLE 13

| Ex. No. | Comparison Ex. No. | Thickener[1] | Composition (%, remainder water) Thickener | Component b) | Component c) | Viscosity (mPa.s) | Thickener effect (mPa.s) |
|---|---|---|---|---|---|---|---|
|  | 20 | Coatex BR 900 | 25 | — | — | too high[2] | — |
|  | 21 | Coatex BR 900 | 25 | 25 | — | 8,600 | 2,900 |
|  | 22 | Coatex BR 900 | 25 | — | 5 | too high[2] | — |
| 44 |  | Coatex BR 900 | 25 | 21.5 | 3.5 | 2,600 | 2,900 |
|  | 23 | Coatex BR 910 | 25 | — | — | too high[2] | — |
|  | 24 | Coatex BR 910 | 25 | 25 | — | 5,300 | 2,800 |
|  | 25 | Coatex BR 910 | 25 | — | 5 | too high[2] | — |
| 45 |  | Coatex BR 910 | 25 | 21.5 | 3.5 | 1,600 | 2,800 |

[1] Sales product of COATEX SA, France
[2] >60,000 mPa.s

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thickener composition for thickening aqueous systems which comprises a mixture of
   a) a water-soluble or water-dispersible thickener containing urethane groups,
   b) a non-ionic emulsifier and
   c) a compound corresponding to the formula

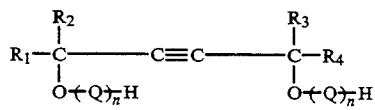
(I)

wherein $R_1$ and $R_3$ may be the same or different and represent hydrocarbon radicals, $R_2$ and $R_4$ may be the same of different and represent hydrogen or hydrocarbon radicals, Q represents alkylene oxide units obtained by the alkoxylation of alcohols with alkylene oxides having 2 to 4 carbon atoms, and n represents a number from 0 to 120.

2. The thickener composition of claim 1 wherein component b) comprises one or more compounds corresponding to the following formula $$R-[X-(Q')_x-H]_y \quad (II)$$

wherein

R represents a hydrocarbon radical having 6 to 50 carbon atoms and which may contain inert substituents, X represents oxygen or a radical corresponding to the formula

Q' represents alkylene oxide units obtained from the alkoxylation of alcohols with alkylene oxides having 2 to 4 carbon atoms, x represents a number from 1 to 300 and y represents a number from 1 to 20.

3. The thickener composition of claim 2 wherein

R represents an aromatic or alkaromatic hydrocarbon radical having a total of 6 to 40 carbon atoms which may contain one or more aromatic rings and/or inert substituents, X represents oxygen and Q' represents ethylene oxide and/or propylene oxide units, provided that at least 70 mol-% of the radicals are ethylene oxide units.

4. The thickener composition of claim 1 wherein $R_1$ and $R_3$ each represent methyl groups, $R_2$ and $R_4$ each represent 2-methyl-propyl groups, Q represents alkylene oxide units containing 70 to 100 mol-% of ethylene oxide units with the remainder propylene oxide units, and n is 0 to 20.

5. The thickener composition of claim 2 wherein
R₁ and R₃ each represent methyl groups,
R₂ and R₄ each represent 2-methyl-propyl groups,
Q represents alkylene oxide units containing 70 to 100 mol-% of ethylene oxide units with the remainder propylene oxide units, and
n is 0 to 20.

6. The thickener composition of claim 3 wherein
R₁ and R₃ each represent methyl groups,
R₂ and R₄ each represent 2-methyl-propyl groups,
Q represents alkylene oxide units containing 70 to 100 mol-% of ethylene oxide units with the remainder propylene oxide units, and
n is 0 to 20.

7. The thickener composition of claim 1 wherein said mixture is present as an aqueous solution or dispersion at a concentration of 1 to 80% by weight, based on the total weight of the composition.

8. The thickener composition of claim 6 wherein said mixture is present as an aqueous solution or dispersion at a concentration of 1 to 80% by weight, based on the total weight of the composition.

9. A thickener composition for thickening aqueous systems which comprises a mixture of
a) a water-soluble or water-dispersible thickener containing urethane groups,
b) a non-ionic emulsifier and
c) a compound corresponding to the formula

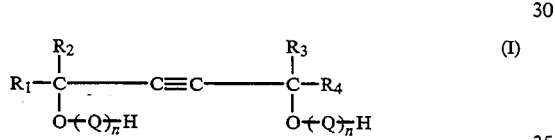

wherein
R₁ and R₃ may be the same or different and represent hydrocarbon radicals,
R₂ and R₄ may be the same of different and represent hydrogen or hydrocarbon radicals,
Q represents alkylene oxide units obtained by the alkoxylation of alcohols with alkylene oxides having 2 to 4 carbon atoms, and
n is a number from 0 to 120, and
wherein component b) is present in an amount of 0.5 to 80% by weight and component c) is present in an amount of 0.5 to 40% by weight, provided that the total amount of components b) and c) is at most 90% by weight, the percentages being based on the total weight of components a), b) and c).

10. The thickener composition of claim 9 wherein component b) comprises one or more compounds corresponding to the following formula

R—[X—(Q')ₓ—H]ᵧ     (II)

wherein
R represents a hydrocarbon radical having 6 to 50 carbon atoms and which may contain inert substituents,
X represents oxygen or a radical corresponding to the formula

Q' represents alkylene oxide units obtained from the alkoxylation of alcohols with alkylene oxides having 2 to 4 carbon atoms,
x represents a number from 1 to 300 and
y represents a number from 1 to 20.

11. The thickener composition of claim 10 wherein
R represents an aromatic or alkaromatic hydrocarbon radical having a total of 6 to 40 carbon atoms which may contain one or more aromatic rings and/or inert substituents,
X represents oxygen and
Q' represents ethylene oxide and/or propylene oxide units, provided that at least 70 mol-% of the radicals are ethylene oxide units.

12. The thickener composition of claim 9 wherein
R₁ and R₃ each represent methyl groups,
R₂ and R₄ each represent 2-methyl-propyl groups,
Q represents alkylene oxide units containing 70 to 100 mo 1-% of ethylene oxide units with the remainder propylene oxide units, and
n is 0 to 20.

13. The thickener composition of claim 10 wherein
R₁ and R₃ each represent methyl groups,
R₂ and R₄ each represent 2-methyl-propyl groups,
Q represents alkylene oxide units containing 70 to 100 mol-% of ethylene oxide units with the remainder propylene oxide units, and
n is 0 to 20.

14. The thickener composition of claim 11 wherein
R₁ and R₃ each represent methyl groups,
R₂ and R₄ each represent 2-methyl-propyl groups,
Q represents alkylene oxide units containing 70 to 100 mol-% of ethylene oxide units with the remainder propylene oxide units, and
n is 0 to 20.

15. The thickener composition of claim 9 wherein said mixture is present as an aqueous solution or dispersion at a concentration of 1 to 80% by weight, based on the total weight of the composition.

16. The thickener composition of claim 14 wherein said mixture is present as an aqueous solution or dispersion at a concentration of 1 to 80% by weight, based on the total weight of the composition.

* * * * *